United States Patent Office 3,311,650
Patented Mar. 28, 1967

3,311,650
PROCESS FOR PRODUCING TRIOCTYL-
ALUMINUM SULFONATE
William K. Johnson, Des Peres, Mo., assignor to Monsanto Company, a corporation of Delaware
No Drawing. Filed Sept. 6, 1963, Ser. No. 307,030
1 Claim. (Cl. 260—448)

This invention relates to materials having utility as surface active agents.

In a particular aspect of this invention surface active agents are prepared. In another aspect of this invention a novel process is described for the preparation of surface active agents.

An object of this invention is the preparation of sulfonic acids of the general formula R—$SO_3H$, wherein R is a monovalent hydrocarbon radical, and the salts of these acids.

According to the instant invention an organoaluminum compound and a sulfonating agent react to yield the aluminum salt of the corresponding organosulfonic acid. The aluminum salt can be isolated or it can readily be converted to the free acid or to other salts by well known procedures.

The present invention is particularly adaptable to the preparation of alkane sulfonic acids. Prior art processes for preparing these useful materials are inadequate for many purposes. The standard procedure for synthesizing a 1-alkane sulfonic acid involves the reaction of a n-alkyl halide, preferably the expensive bromide, with sodium sulfite at elevated temperatures.. The reactants do not mix readily and the reaction is slow. Additionally, purification of the product is accomplished with difficulty.

According to my invention an organoaluminum compound, of the general formula $AlR_nX_{3-n}$, wherein R is a monovalent hydrocarbon radical free of olefinic unsaturation, X is a halogen, and $n$ is an integer having a value of 1, 2, or 3, is treated with sulfur trioxide, or a sulfur trioxide complex, whereby an organic sulfonic acid salt having the formula $Al(SO_3R)_nX_{3-n}$ is produced. The complex aluminum salts can readily be converted to other salts or to the free sulfonic acid. The products of the process are obtained in excellent yields.

If it is desired to utilize the invention to prepare surface active agents, organoaluminum compounds will be selected having hydrocarbon substituents of the necessary carbon chain length to produce substantial hydrophobic characteristics in the product molecules. Thus, the preferred organoaluminum reactants will have the formula $AlR_3$, wherein R is an aliphatic hydrocarbon radical of from about 8 to 20 carbon atoms. The alkyl radicals can be either straight chain or branched. It is understood that organoaluminum reactants of the formula $AlR_nX_{n-3}$ can also be used to prepare surface active agents, but for optimum production of the desired compounds, it is generally preferred to use a trialkylaluminum compound as starting material.

The lower alkane sulfonates and also the lower alkyl aromatic sulfonates or aromatic sulfonates that can be prepared by my process find application in surface active agent formulations as hydrotropes, where they act as solubilizing agents. The solubilizing or dispersing activity is general for most of the sulfonates of lower molecular weight, and thus they are used in the preparation of penetrating-type dye baths and other textile treatments.

Since the process of this invention has broad application in the preparation of useful sulfonates, I can mention representative organoaluminum compounds that can serve as initial reactants by way of example without any intent to limit the scope of the invention. Thus, the process is operable when the initial reactant is triethylaluminum
dibutylaluminum chloride
decylaluminum dibromide
trioctylaluminum
didodecylaluminum iodide
tridecylaluminum dichloride
ditetradecylaluminum fluoride
triphenylaluminum
diphenethylaluminum chloride
tolylaluminum dibromide
naphthylaluminum diiodide
hexadecylaluminum dibromide
octadecylaluminum dichloride
trihexylaluminum Although the above list includes representative reactants, the invention can be practiced, if desired, with mixtures of organoaluminum compounds, and also with the complex organoaluminums such as the organoaluminum sesquihalides. The organoaluminum reactant can be used as the complex with compatible solvents such as the etherate if desired.

The preparation of halogen-containing alkylaluminum compounds may be carried out by a number of known methods. By way of example, reference may be made to U.S. Patent No. 2,271,956 which patent describes a process for preparing various alkylaluminum halides higher than the methyl derivatives.

The alkylaluminum halides useful in the present process also include the unresolved mixtures of compounds which are obtained by the action of an aluminum alkyl on an aluminum halide.

Many of the aluminum compounds contemplated herein may be prepared by reacting aluminum hydride with the corresponding olefin as described in German Patent No. 917,606. By this means olefins such as isobutylene may be reacted with aluminum hydride and triisobutylaluminum obtained directly. The triisobutylaluminum so obtained may be reacted by an exchange reaction with an α-olefin which is mono-substituted on the β-carbon atom generally giving an aluminum trialkyl containing almost exclusively the normal alkyl chain and at the same time liberating isobutylene. An exception to this general rule, wherein normal aluminum trialkyls are formed, I have found to exist in the case where styrene is reacted with triisobutylaluminum. In this case mixtures of triphenethylaluminum-containing compounds are produced in which mixtures of compounds having the α- and β-carbon atoms joined to the aluminum atom are present.

The trialkylaluminum compounds may also be formed by reaction between triethylaluminum and ethylene or propylene as described in Brennstoff Chemie, volume 35, pages 321–25 (1954). By this means mixtures of trialkylaluminum compounds having four or more carbon atoms in the alkyl chain may be readily obtained. The direct products yielded by the reaction may be used if desired without separating the individual compounds present in the mixture and in this way unresolved mixtures of alkane sulfonates obtained.

The reaction of this invention is preferably conducted by employment of sulfur trioxide as the sulfonation reactant. The sulfur trioxide can be charged to the reaction vessel as a liquid, as a vapor, or in the form of a coordination compound with dioxane, pyridine or quinoline. The sulfur trioxide coordination compounds, known as complexes, are limited to those which are formed from sulfur trioxide and compounds which do not contain an active hydrogen atom in their molecular structure. The active hydrogen-containing materials preferentially react with the organoaluminum compound to yield hydrocarbons.

The reaction obtained by the practice of the invention is believed to proceed according to the following equation $$AlR_nX_{3-n} + nSO_3 \rightarrow Al(SO_3R)_nX_{3-n}$$

wherein R, X and $n$ are as described above. The aluminum salt initially obtained can be acidified to prepare the sulfonic acid, or other salts can be prepared. For example, the sodium salt can be obtained by the addition of sodium hydroxide to a solution of the aluminum salt. The aluminum ion is removed as the hydroxide and the sodium salt obtained in solution. The alkali metal salts, the ammonium salts, and the substituted ammonium salts of the sulfonic acids are suitable for various uses as surface active agents. The alkaline earth metal, and zinc salts of the longer chain sulfonates find application in the oil additive field. Salt interchange reactions and ion exchange techniques can be used to prepare the desired products from the aluminum sulfonate intermediate.

The sulfonation can be carried out in a solvent or diluent that is inert to the organoaluminum compound. Although a solvent is not necessary, the use of a solvent permits ease in product purification. The reaction is accompanied by the liberation of heat which is dissipated by suitable cooling means to avoid the possibility of decomposition of the reactants or charring with resultant loss of organoaluminum compound. Generally a reaction temperature within the range of 0° C. or below up to about 150° C. can be used although preferably the reaction is conducted at about 0° up to about 100° C.

Contaminants which react with the organoaluminum reactant should be excluded from the reaction vessel to avoid loss of the aluminum compound in side-reactions. Thus the reaction is preferably carried out under substantially anhydrous conditions in an inert atmosphere, since the presence of moisture, oxygen and carbon dioxide results in consumption of the organoaluminum reactant, as these materials react with the organoaluminum compound.

The sulfonation reaction proceeds to give essentially quantitative yields of the desired product. I charge about 1 to 1.5 moles of sulfur trioxide to the reactor for each mole equivalent of hydrocarbon radical, preferably from about 1 to 1.2 moles sulfur trioxide. As a general guide a 5 to 20 mole percent excess of sulfur trioxide is adequate to insure complete sulfonation.

Investigators studying the reactions of organometallic compounds have observed certain similarities in the reactions of organoaluminum compounds and Grignard reagents. The instant invention gives a surprising result since a Grignard reagent does not react with sulfur trioxide to yield a hydrocarbon sulfonate.

In order to illustrate some of the various aspects of the the invention and to serve as a guide in applying the invention the following specific examples are given. It will be understood that variations from the particular temperatures, diluents or solvents, proportions, etc. can be made without departing from the invention.

*Example 1*

A sulfur trioxide complex with dioxane was prepared by slowly adding 39 g. sulfur trioxide to 100 ml. dry dioxane. The solution was further diluted with 100 ml. dry dioxane. The complex was maintained in an atmosphere of dry nitrogen in a glass reaction vessel fitted with a dropping funnel and a motor-driven stirring device. A solution of 24 g. triethylaluminum etherate in 100 ml. dry dioxane was then added dropwise to the complex in 90 minutes at a reaction temperature of 8–10° C., maintained by an external ice bath. The mixture was then stirred for an hour at room temperature and the solvents stripped off by distillation at reduced pressure. The product, $$(CH_3CH_2SO_3)_3Al$$

a cream-colored solid, was dried at 100° C. This material was readily soluble in water and thus offers a convenient method for preparing salts of ethane sulfonic acid. For example, addition of aqueous sodium hydroxide results in precipitation of aluminum hydroxide which is filtered off. The filtrate is an aqueous solution of sodium ethane sulfonate.

*Example 2*

A solution of tri-n-octylaluminum, 30 g., in 150 ml. of dry dioxane was charged into a nitrogen swept 500 ml. flask fitted with stirrer, thermometer, reflux condenser and gas inlet port opening above the surface of the solution. A charge of 22 g. liquid sulfur trioxide was placed in a bulb connected to the gas inlet port. A slow stream of dry nitrogen was used to sweep vapors of sulfur trioxide above the surface of the rapidly stirred trioctylaluminum-dioxane solution. The reaction rate was controlled by varying the flow of nitrogen over the sulfur trioxide, and addition was completed after 4 hours. An ethoxermic reaction was noted and external cooling was used intermittently to maintain the reaction temperature at 25–30° C. The solution in the reactor became viscous as reaction occurred. Solvent was stripped from the reaction mixture under reduced pressure and an essentially quantitative yields of aluminum tri(n-octane sulfonate), $$(n-C_8H_{17}SO_3)_3Al$$

obtained. This salt was readily soluble in water and ethanol. The benzylthiuronium salt of n-octanesulfonic acid was prepared and melted at 103–104° C. after recrystallization from 30% ethanol. The elemental analysis of this derivative was used to prove that n-octanesulfonic acid had been obtained:

Calculated for $C_{16}H_{28}N_2O_3S_2$: C, 53.37; H, 7.84; N, 7.78; S, 17.80. Found: C, 54.02; H, 7.37; N, 7.20; S, 17.32.

In a similar manner sulfonates were prepared by the addition of sulfur trioxide to tridodecylaluminum, tritetradecylaluminum and triphenethylaluminum. The triphenethylaluminum employed was prepared by the reaction of 3 moles of styrene monomer and 1 mole of triisobutylaluminum. The reaction was carried out by first heating the triisobutylaluminum in the absence of air to about 120° and then dropping the styrene monomer into the aluminum compound. Evolution of isobutylene occurred, and the reaction was complete in about four hours. The yield of product was approximately quantitative.

The alkali metal salts of the alkanesulfonates having from about eight to twenty carbon atoms are of particular value as surface active agents, having properties as detergents and emulsifiers. These surface active agents are readily biodegradable and thus find applications where this property is required, such as in heavily populated areas where certain surface active agents, which are not biodegradable, interfere with water purification processes.

The process of this invention can be carried out in the presence of a solvent or diluent which may or may not completely dissolve the aluminum sulfonate during the course of the reaction. As already pointed out, the reaction environment should also be free of oxygen, water—in liquid or vapor form, and also free of $CO_2$, $H_2S$ and other acidic compounds. The solvent or diluent should likewise be a compound which is compatible with respect to the reactants. For this purpose organic compounds of the aromatic series; as for example benzene, toluene, xylene, ethyl benzene or saturated compounds of the aliphatic series; such as, butane, pentane, hexane, cyclohexane, methylcyclohexane, etc. can be employed. Various ethers can also be employed as solvents. Among the ethers may be mentioned diethyl ether, tetrahydrofurane, dioxane, ethylene glycol dimethyl ether or ethylene glycol diethyl ether. These can be employed alone or with other solvents mentioned above.

The temperature at which the reaction is carried out is not critical and may range generally from 0° C. to 80° C. or 100° C. or higher. The temperature is generally chosen so as to give a reaction rate which can be controlled by the available cooling means at hand. In general, a higher temperature causes a faster reaction and a greater rate of release of exothermic heat while a lower temperature causes a slow reaction and likewise a slower rate of heat release.

While the invention has been described with particular reference to preferred embodiments thereof, it will be appreciated that variations from the details given herein can be effected without departing from the invention in its broadest aspects.

I claim:

The process of producing trioctylaluminum sulfonate which comprises treating trioctylaluminum with sulfur trioxide.

References Cited by the Examiner

UNITED STATES PATENTS

| | | | |
|---|---|---|---|
| 2,459,995 | 1/1949 | Duncan et al. | 260—448 X |
| 2,491,043 | 12/1949 | Hersberger | 260—448 |
| 2,502,619 | 4/1950 | Proell et al. | 260—448 X |
| 2,504,107 | 4/1950 | Christian et al. | 260—448 |
| 2,760,970 | 4/1956 | LeSuer | 260—448 X |
| 2,807,642 | 9/1957 | Block et al. | 260—513 X |
| 2,909,563 | 10/1959 | Whitney | 260—448 X |
| 3,121,737 | 2/1964 | Rutkowski et al. | 260—513 |

OTHER REFERENCES

Rochow et al.: "The Chemistry of Organometallic Compounds," 1957 (New York).

LORRAINE A. WEINBERGER, *Primary Examiner.*

LEON ZITVER, RICHARD K. JACKSON, *Examiners.*

BRUCE M. EISEN, M. WEBSTER, *Assistant Examiners.*